Patented Aug. 15, 1933

1,922,390

UNITED STATES PATENT OFFICE 1,922,390

PROCESS OF RECOVERING ZINC FROM BRASS SCRAP AND OTHER MATERIALS CONTAINING ZINC

William J. O'Brien, Cleveland, Ohio, and Joseph E. Drapeau, Jr., New York, N. Y., assignors to The Glidden Company, Cleveland, Ohio, a Corporation of Ohio No Drawing. Application April 20, 1931
Serial No. 531,620

1 Claim. (Cl. 23—125)

This invention relates to the process of recovering zinc from brass by means of a blast furnace or converter, the treatment of the zinc with sulphuric acid and the removal of the impurities from the solution and has for its object the recovery of zinc with not more than a minor trace of impurities which is suitable for use in the manufacture of lithopone and other products.

In the manufacture of lithopone zinc materials with not more than a minor trace of impurities are necessary because the lithopone must be of exceptional whiteness and must have a fair degree of light stability. It is well known in the art that a zinc sulphate solution containing more than one part per million of nickel per liter of zinc sulphate solution of 35° Beaumé, 60° Fahrenheit temperature, will when combined with barium sulphide produce a lithopone which has a decided yellow cast. Traces of iron as low as three or four parts per million per liter of zinc sulphate solution of 35° Beaumé, 60° Fahrenheit temperature, will when combined with barium sulphide produce a lithopone which has a decided pinkish cast. Minute traces of copper in the zinc sulphate solution will cause a grayish cast. More than three tenths grains of chlorine in the zinc sulphate solution will affect the photogenic properties of the lithopone.

A large supply of zinc is available in brass scrap but no process that we know of has been developed up to the present time for recovering the impurities so that said zinc is available for the satisfactory and economical manufacture of lithopone and other products requiring a zinc with not more than a minor trace of impurities.

In carrying out our invention secondary brass metals, such as brass scrap from old radiators, brass pipe, etc., are either baled, broken or thrown directly into the blast furnace or converter, depending on the iron content. In conducting the operation enough air is used to give the necessary combustion, but not sufficient air to oxidize the copper.

Under this treatment the zinc is fumed off first as metallic zinc, which burns in the flues to zinc oxide. Along with the zinc are carried various amounts of other impurities, such as arsenic, antimony, tin, lead, copper and chlorine.

The hot fume is then carried by means of suitable flues through a dust settling chamber where the coarse particles are removed mechanically, and then into a fine fume collecting system consisting of bags. In order to get the proper results not only must the quantity of air permitted in the system be controlled, but the proper temperature maintained. This temperature we have found to be somewhere between 200° and 230° Fahrenheit.

From the dust collecting equipment the material is run directly into leaching tanks provided with agitator. In the leaching tanks the zinc fume is treated with sulphuric acid. As rapid a leach as possible is made so as to avoid settling troubles. The leach is finished off slightly acid. We have found that a slightly acid leach is necessary to prevent the loss of copper, to aid in the removal of chlorine and to aid settling.

The attack box operation is so carried on that the resulting zinc sulphate solution will be approximately 35° Beaumé at 130° Fahrenheit and will contain approximately one part of solids per ten parts of liquid.

It was found that because of the extremely colloidal nature of the resulting suspension, no filtering operation could be successfully employed. However, by adjusting the proper acid conditions—which should be approximately 1% free sulphuric acid—it was found that the material could be settled in sufficiently large tanks so that an economic separation of the solids from the liquids could be carried out. The resulting zinc sulphate solution contains 10 grams of acid per liter, 7 grams of chlorine per liter, about 6 grams of copper per liter, 2 grams of iron per liter, 5 grams of arsenic per liter, and varying amounts of nickel, tin, cadmium and other impurities.

Because of the complexity of the impurities and the large quantity present, special methods of treatment are involved. The chlorine is removed as copper chloride by the addition of copper powder and copper sulphate in the proportions of one gram of copper per liter to one gram of chlorine. The arsenic and part of the iron is removed by treatment with lime, after the zinc sulphate solution has been neutralized with zinc oxide. The other impurities are removed according to well-known methods.

The resulting purified zinc sulphate solution will contain approximately 10% zinc as zinc sulphate from one-tenth to two-tenth grams of chlorine per liter, less than one part per million nickel, faint traces of iron and manganese, and is suitable for lithopone manufacture.

The zinc sulphate solution is pumped to a precipitating tank, combined with barium sulphide solution, and the process from there on is carried out in the manner well known to those skilled in the art of making lithopone.

We claim:

The process of recovering zinc from brass scrap, for use in the manufacture of lithopone containing not more than a minor trace of impurities, which comprises heating the brass scrap in the presence of air in sufficient quantity to oxidize the zinc to zinc oxide but not sufficient to affect the copper present in the brass scrap, collecting the zinc fume, dissolving the zinc fume with sulphuric acid, removing chlorine by adding copper powder and copper sulphate in the proportion of one gram of copper per liter to one gram of chlorine, neutralizing the acid solution with zinc oxide, eliminating arsenic and part of the iron by treating with lime, and removing all but a minor trace of all other impurities.

WILLIAM J. O'BRIEN.
JOSEPH E. DRAPEAU, Jr.